US007070078B2

(12) United States Patent
Song

(10) Patent No.: US 7,070,078 B2
(45) Date of Patent: Jul. 4, 2006

(54) AUTOMATIC OPTICAL-FIBER CUTTER

(75) Inventor: Jae Seop Song, Daejeon (KR)

(73) Assignee: Ilsin Precision Co., Ltd. (KR)

( * ) Notice: Subject to any disclaimer, the term of this patent is extended or adjusted under 35 U.S.C. 154(b) by 0 days.

(21) Appl. No.: 11/063,676

(22) Filed: Feb. 23, 2005

(65) Prior Publication Data
US 2005/0169594 A1    Aug. 4, 2005

Related U.S. Application Data

(63) Continuation of application No. PCT/KR03/01652, filed on Aug. 14, 2003.

(30) Foreign Application Priority Data
Aug. 26, 2002  (KR) .................. 20-2002-0025450
Apr. 28, 2003  (KR) .................. 10-2003-0026763

(51) Int. Cl.
C03B 37/16    (2006.01)
(52) U.S. Cl. .............. 225/105; 225/96.5; 83/375; 385/136
(58) Field of Classification Search .......... 225/96, 225/96.5, 95, 93, 105; 83/375, 376, 378, 83/380, 382, 387, 879; 385/136
See application file for complete search history.

(56) References Cited

U.S. PATENT DOCUMENTS

| 4,168,026 | A | * | 9/1979 | Lukas et al. ............ 225/96.5 |
| 4,473,942 | A | * | 10/1984 | Ridgway ................ 225/96.5 |
| 4,667,862 | A | * | 5/1987 | Millar et al. ............ 225/96 |
| 5,104,021 | A | * | 4/1992 | Seike et al. ............ 225/96.5 |
| 5,106,006 | A | * | 4/1992 | Suda et al. ............ 225/96.5 |
| 5,125,549 | A | * | 6/1992 | Blackman et al. ........ 225/96.5 |
| 5,395,025 | A | * | 3/1995 | Borer et al. ............ 225/96.5 |
| 6,053,085 | A | * | 4/2000 | Lochkovic et al. ...... 385/134 |
| 6,105,480 | A | * | 8/2000 | Osaka et al. ........... 385/134 |
| 6,244,488 | B1 | * | 6/2001 | Tanaka ................. 225/96.5 |
| 6,467,667 | B1 | * | 10/2002 | Durian et al. .......... 225/96.5 |
| 6,634,079 | B1 | * | 10/2003 | Kazama ................ 225/96 |
| 6,754,426 | B1 | * | 6/2004 | Lee et al. ............. 225/93 |

FOREIGN PATENT DOCUMENTS

| JP | 5232327 | 9/1993 |
| JP | 5323126 | 12/1993 |
| JP | 2001356216 | 12/2001 |
| JP | 2002-286943 | 10/2002 |
| KR | 200257866 | 12/2001 |
| KR | 20020090889 | 12/2002 |
| WO | WO 0045205 | 8/2000 |

* cited by examiner

Primary Examiner—Timothy V. Eley
Assistant Examiner—Jason Prone
(74) Attorney, Agent, or Firm—Michael Best & Friedrich

(57) ABSTRACT

An automatic optical-fiber cutter has a main lid, an auxiliary lid interlockingly opened and closed by the opening/closing operation of the main lid, and a slider provided with an edged tool.

An optical fiber is pressed at two positions by the main lid and the auxiliary lid interlockingly closed by the closing operation of the main lid. At the same time, the slider moves synchronously with the main lid, and the optical fiber is cut by the edged tool. As soon as the auxiliary lid is opened synchronously with the opening operation of the main lid, the slider is returned to an initial position.

3 Claims, 6 Drawing Sheets

AUTOMATIC OPTICAL-FIBER CUTTER

CROSS-REFERENCE TO RELATED APPLICATIONS

Priority is hereby claimed to international patent application number PCT/KR/2003/001652 filed on Aug. 14, 2003, Korean Patent Application Number 2003-0026763 filed on Apr. 28, 2003, and Korean Utility Model Application Number 2002-0025450 filed on Aug. 26, 2002, the entire contents of which are incorporated herein by reference.

BACKGROUND OF THE INVENTION

1. Field of the Invention

The present invention relates to a cutter, more particularly to an automatic optical-fiber cutter capable of easily and precisely cutting an optical fiber in one-stroke manipulation.

2. Description of the Related Arts

An optical fiber is a wave-guide for transmitting light and, in general, used in cables made up a bundle of optical fibers.

The optical fiber comprises a core and a cladding formed around the core, and another cladding made of plastic encloses the cladding. The optical fiber is used in digital communications because a number of communication lines are housed in a piece of optical fiber. The optical communication lines are very tolerant of electromagnetic interference, crosstalk and wiretap.

In order to couple an optical fiber to communication equipment, it may be required to cut the optical fiber. In those cases in which the optical fiber is not cut at right angles to the optical axis direction, a transmission loss of light is occurred. Therefore, it is required to have high accuracy in the cutting of the optical fiber.

Japanese Laid-Open Patent Publication No. H07-81970 discloses an optical-fiber cutter. The optical-fiber cutter comprises two lids by which an optical fiber is pressed at two positions, and a slider mounting an edged tool for cutting the under surface of the optical fiber in one stroke. The edged tool is able to cut the optical fiber in one stroke without trembling so that the accuracy of the cutting is ensured.

In using the cutter of the prior art above described, however, it is troublesome to manipulate it. Hereinafter, the handling of the two lids and the slider will be described in detail. First of all, an optical fiber is set on a cutting position, then handled in the following steps:

a) First, covering with an auxiliary lid and pressing down the optical fiber in one position.

b) Second, covering a main lid and pressing down the optical fiber in two positions.

c) Third, moving the slider crosswise to cut the optical fiber in one stroke.

d) Fourth, opening the main and auxiliary lids by reversing the order and retrieving the cut optical fiber, then returning the slider.

The construction of the optical-fiber cutter of the prior art above described, is troublesome to use because an operator must manipulate the two lids and the slider in turn, thereby resulting in a loss of efficiency. Moreover, when the operator moves the slider with his fingers, finger power upon the optical fiber via the edged tool is not uniform every time, thereby increasing abrasion of the edged tool. Further, if the operator doesn't observe the rule of the cutting work, the accuracy of the cut surface is not ensured.

SUMMARY

The present invention has been developed to solve the problems with the above-described optical-fiber cutters.

It is an object of the present invention to provide an automatic optical-fiber cutter capable of cutting an optical fiber in one stroke and in an accurate orthogonal plane by opening/closing only a main lid.

It is another object of the present invention to provide an automatic optical-fiber cutter capable of improving the efficiency of work by simply manipulating and easily installing the optical fiber.

In accomplishing the above and other objectives, an automatic optical-fiber cutter according to one aspect of the present invention includes two lids arranged on the upper surface of a stand and by which an optical fiber is pressed at two positions, and a slider provided with an edged tool and arranged to be capable of reciprocating in a groove formed on a side of the stand.

An arm is attached on the side surface of an auxiliary lid opposite a main lid. The main lid has a pressing pin for pressing down the arm, a raising pin for raising up the arm and a lever for returning the slider to a non-cutting position by pressing in a predetermined position thereof, respectively.

Further, a return spring for moving the slider to a cutting position is arranged in the inside of the stand adjacent to the groove, and a hole is opened on the upper side of the stand so as to arrange a protrusion pin pressed by the main lid. A stop pin for connecting with the protrusion pin through the hole to keep the slider in the non-cutting position is arranged in a predetermined position on the upper surface of the slider.

The above arrangement also includes a magnet for keeping the auxiliary lid closed by using a magnetic force. The magnet is fitted into the upper surface of the stand.

It is desirable that the arm of the auxiliary lid is formed in a shape of an arc.

An automatic optical-fiber cutter according to another aspect of the present invention includes two lids arranged on the upper surface of a stand and by which an optical fiber is pressed at two positions, and a slider provided with an edged tool and arranged to be capable of reciprocating in a groove formed on a side of the stand.

An arm is attached on the side surface of the auxiliary lid opposite to the main lid. The main lid has a pressing pin for pressing down the arm, a raising pin for raising up the arm and a pressing pole for moving the slider to a cutting position by pressing in a predetermined position thereof, respectively.

A return spring for returning the slider to a non-cutting position is arranged in the inside of the stand adjacent to the groove. Further, a cam for connecting with the pressing pole of the main lid is formed on the inside of the slider.

An automatic optical-fiber cutter according to still another aspect of the present invention includes two lids arranged on the upper surface of a stand and by which an optical fiber is pressed at two positions, and a slider provided with an edged tool and arranged to be capable of reciprocating in a groove formed on a side of the stand. The main lid has a size capable of covering the upper surface of the stand. A touch piece for including a magnet is arranged on a lower surface of the main lid. The auxiliary lid is pressed and closed by the touch piece, or opened by the magnetic force.

Further, a driving gear for reciprocating the slider is fixed in a bearing part of the main lid adjacent to the slider. The driving gear is engaged with a direction change gear arranged on the side surface of the stand. At the same time, the driving gear is engaged with a rack attached in a predetermined position on the upper surface of the slider. The slider moves synchronously with the opening/closing of the main lid.

An automatic optical-fiber cutter according to still another aspect of the present invention includes two lids arranged on the upper surface of a stand and by which an optical fiber is pressed at two positions, and a slider provided with an edged tool and arranged to be capable of reciprocating in a groove formed on a side of the stand. The main lid has a size capable of covering the upper surface of the stand. The auxiliary lid is pressed and closed by a touch piece, or opened by a torsion spring or a magnetic force. Further, a lever for returning the slider to a non-cutting position by pressing is arranged in a predetermined position. A return spring for moving the slider to a cutting position is arranged in the inside of the stand adjacent to the groove, and a hole is opened on the upper side of the stand so as to arrange a protrusion pin pressed by the main lid. Further, a stop pin is arranged in a predetermined position on the upper surface of the slider and connected with the protrusion pin through the hole of the stand, so that the slider stays in the non-cutting position.

DETAILED DESCRIPTION

Figure 1:
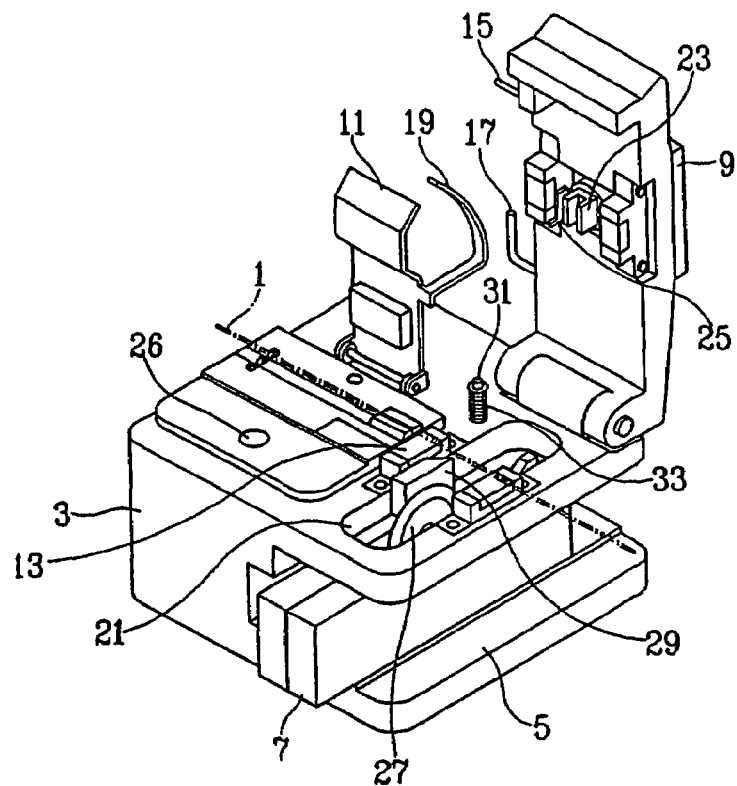
FIG. 1 is a perspective view showing an optical-fiber cutter according to a first embodiment of the present invention.

Referring now to the attaching drawings, an optical-fiber cutter according to an embodiment of the present invention will be described in detail. It is noted that like parts are designated by like reference numerals throughout the accompanying drawings.

FIRST EMBODIMENT

FIG. 1 to 6 show an optical-fiber cutter according to the first embodiment of the present invention. FIG. 1 depicts the external appearance of the optical-fiber cutter.

Generally, an optical fiber can be loaded in a predetermined position of a stand 3. A groove 5 is formed on a side of the stand 3, and a slider 7 is arranged to be capable of reciprocating along the inside of the groove 5. The reciprocating direction of the slider 7 is set in a direction at a right angle to the axis of the optical fiber.

Further, a main lid 9 and an auxiliary lid 11 are arranged on the upper side of the stand in turn. The two lids 9, 11 press the optical fiber 1 at two positions in cooperation with an optical-fiber housing 13.

A raising pin 15 and a pressing pin 17 arranged at a proper interval are attached on a side of the main lid 9. On the other hand, corresponding to the pins, an arm 19 formed in a shape of an arc is arranged on the opposite side of the main lid 9.

A part contacted by the main lid 9 is formed as a notch 21 on the upper surface of the stand 3.

Each end of the main lid 9 and the auxiliary lid 11 is fitted pivotally on the stand 3, respectively, and each free end of the opposite sides is able to opened/closed. A counter holder 23 for pressing down the optical fiber 1 is integrally formed with a stopper 25 on the under surface of main lid 9.

With this arrangement, the main lid 9 and the auxiliary lid 11 are different from each other in the rotation point and the radius. For example, when the lids are opened, the raising pin 15 is placed on the outside of the arc part of the arm 19. On the other hand, during closing, the raising pin 15 is set to insert into the inside of it.

Further, after the auxiliary lid 11 is closed, the closed state is maintained by magnetic force of a magnet 26 inserted into the stand 3.

The slider 7 has an edged tool 27 and a protrusion part 29. A portion of the edged tool 27 is passed through the notch 21 and exposed on the upper surface of the stand 3. The protrusion part 29 defines the reciprocation distance within the notch 21.

A protrusion pin 31 formed on the upper surface of the stand 3 is biased upward by a spring 33. The lower end of the protrusion pin 31, as shown FIG. 2, is passed through the stand 3 and extended to the upper side of the groove 5.

At a non-cutting position, the lower end of the protrusion pin 31 is engaged with the upper end of a stop pin 35 formed on the upper surface of the slider 7, so that the slider 7 can be restrained against movement.

Figure 3:
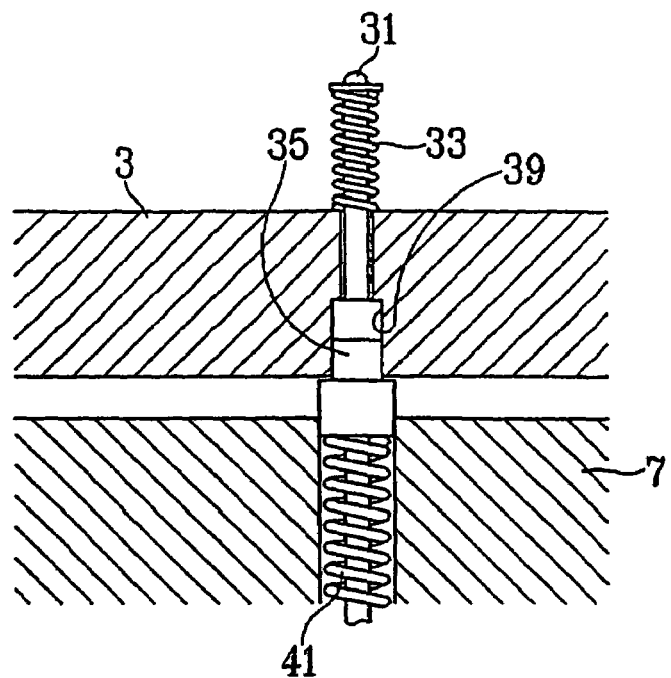
FIG. 3 is a partial cross-sectional view showing a relationship between the protrusion pin and the stop pin shown in FIG. 1.

That is to say, the under end of the protrusion pin 31, as shown FIG. 3, is inserted into a hole 39 that passes perpendicularly through the stand 3, and the stop pin 35 is always biased upward by the spring 41. Accordingly, the upper end of the stop pin 35 is inserted into the hole 39 to engage the protrusion pin 31. Therefore, the slider 7 is kept without moving at the non-cutting position.

Figure 2:
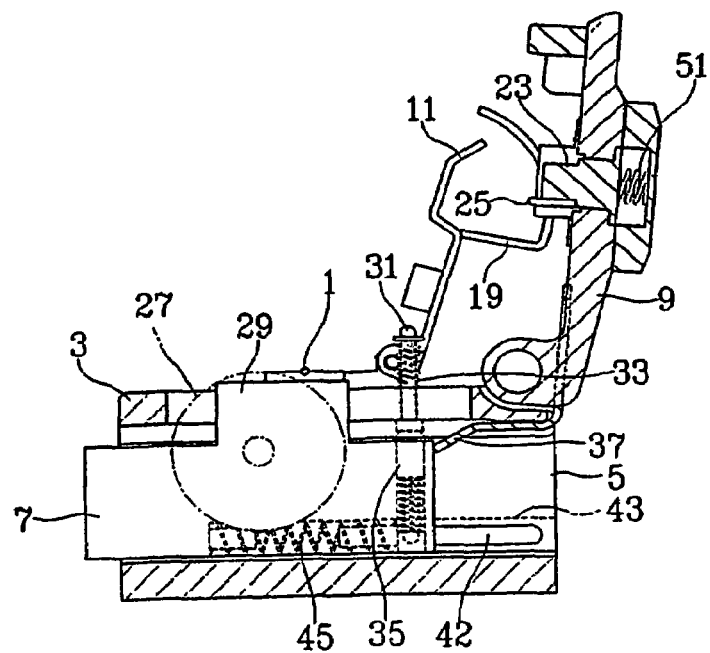
FIG. 2 is a front cross-sectional view showing the optical-fiber cutter whose main and auxiliary lids are opened.

Referring to FIG. 2, a lever 37 is formed on the back end of the main lid 9. The lever 37 presses and moves the slider 7 to the non-cutting position when the main lid 9 is opened.

A return spring 45 is housed in a housing hole 43 which is opened together with a path 42 of a long-hole shape in the underside of the groove 5. Under force from the return spring 45, the slider 7 is always biased toward the cutting direction.

Figure 4:
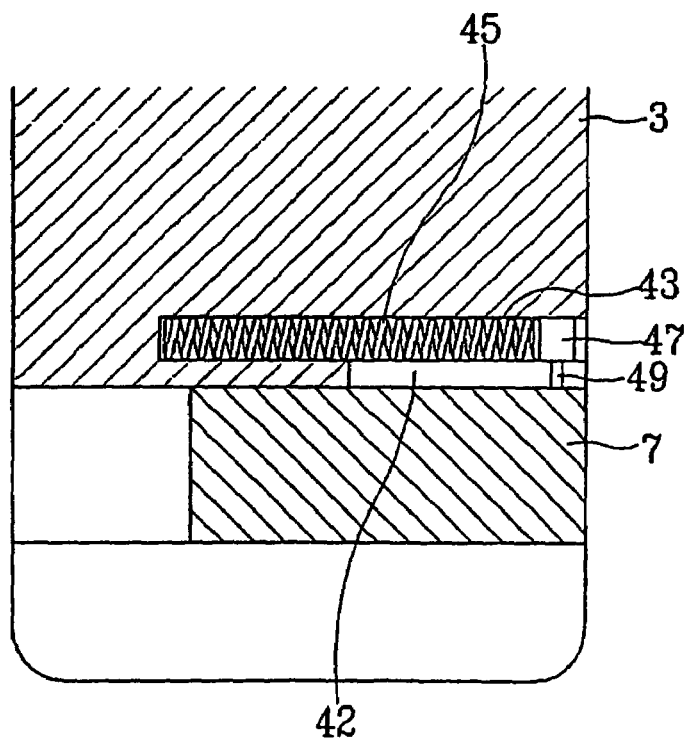
FIG. 4 is a partial cross-sectional view showing a structure for returning a slider.

In more detail, as shown FIG. 4, the return spring 45 is housed in the housing hole 43 punched to communicate with the path 42. The return spring 45 is connected with a sheet member 47 formed on the inlet thereof and the sheet member 47 is connected with the slider 7 through a pin 49 extended over the path 42, so that the biasing force of the return spring 45 is applied to the slider 7.

With above construction, when the slider 7 is moved to the non-cutting position by the lever 37 as shown FIG. 2, the return spring 45 is pressed.

Further, as shown FIG. 2, the counter holder 23 is always protruded to the closed direction by being biased by the spring 51 housed in the main lid 9.

Next, the operation according to above construction will be described. When an operator closes the opened main lid 9 as shown by the solid line in FIG. 5, the pressing pin 17 presses and closes the outside of the arc-shaped part of the arm 19. Then, the auxiliary lid 11 also starts to close together with the main lid 9, but automatically revolves to close upon reaching a certain point.

Figure 5:
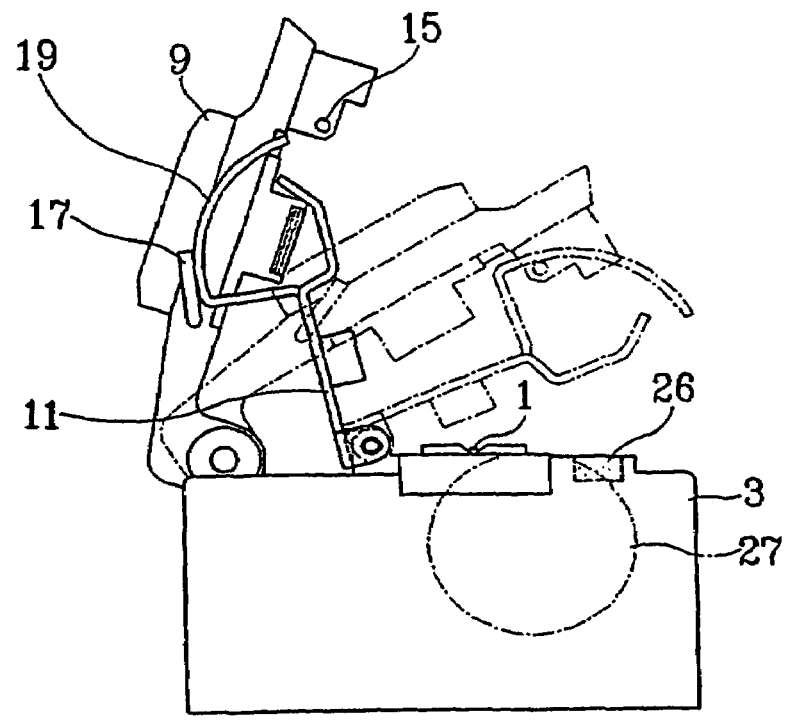
FIG. 5 is a back view showing the closing operation of the opened main lid.

At this time, the raising pin 15, which was located in the outside of the arc-shape part of the arm 19, inserts into the inside of the arc-shape part of the arm 19 because the pivoting point and radius of the main lid 9 is different than that of the auxiliary lid 11, and supports the inside surface of it, as shown by the dashed dot line of FIG. 5. Accordingly, the auxiliary lid 11 is closed and holds in the raising pin 15, and is attracted to the magnet 26 upon reaching the upper surface of the stand 3. As such, the auxiliary lid 11 presses the optical fiber 1 earlier than the main lid 9.

Figure 6:
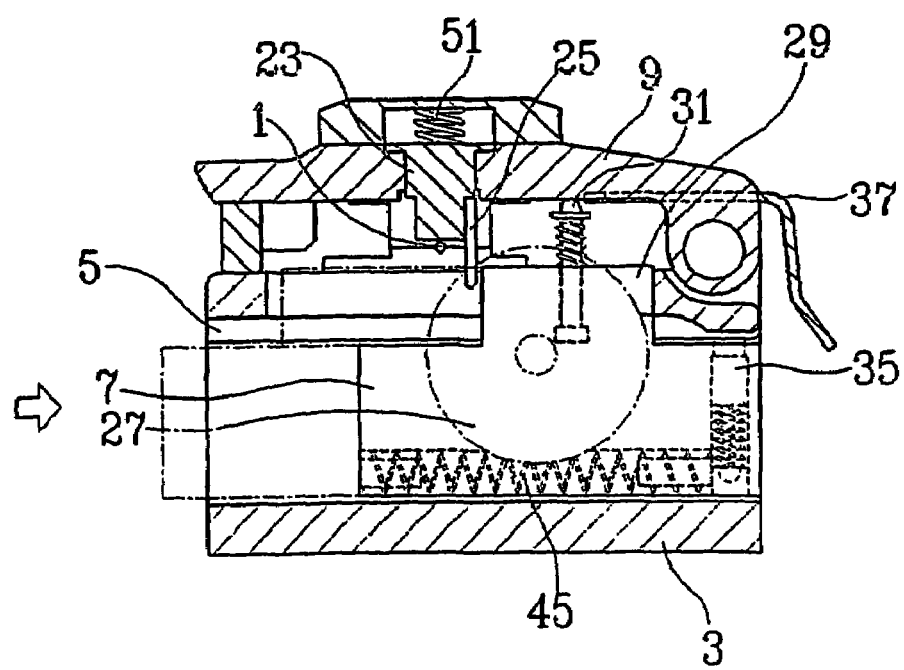
FIG. 6 is a front cross-sectional view showing the optical fiber pressed by the closed main lid.

Next, when the main lid 9 is closed, as shown FIG. 6, the optical fiber 1 is caught and pressed by the counter holder 23. At the same time, the protrusion pin 31 formed on the upper surface of the stand 3 is pressed down by the main lid 9.

When protrusion pin 31 is pressed down, the stop pin 35 of the slider 7 is also pressed down by the lower end of the protrusion pin 31. Accordingly, the stop pin 35 is pulled out through the hole of FIG. 3, so that the slider 7 is released.

On the other hand, the slider 7 is always biased by the return spring 45 in the non-cutting position shown by the dashed lines of FIG. 6. As soon as it is released, the slider 7 moves to the position shown by the dashed lines of FIG. 6, and the edged tool 27 availed itself of the slider 7 passes through under the optical fiber 1 so that one-stroke cutting is performed. In the one-stroke cutting, the optical fiber 1 is cut by pressing with force from the counter holder 23. On the other hand, the stopper 25 is located in the rear side of the protrusion part 29 of the slider 7 so that the slider 7 is prevented from moving backward. Now the cutting of the optical fiber 1 is completed.

When the operator opens the main lid 9 again, as shown by the dashed line of FIG. 5, the auxiliary lid 11 is opened together with the main lid 9 while the arm 19 is raised up by the raising pin 15. At the same time, the lever 33 of the main lid 9 presses the slider 7 to move the slider 7 to the non-cutting position as the slider 7 rotates in the inside of the groove 5. Therefore, the slider 7 is returned to the state shown FIG. 2 and next cutting operation can be performed.

SECOND EMBODIMENT

Next, referring to FIGS. 7 and 8, the construction according to a second embodiment of the present invention will be described.

In this embodiment, the construction of an auxiliary lid 11 opened and closed in response to the main lid 9, although not described, is the same as the above described embodiment. The embodiment of FIGS. 7 and 8 is only different in that the slider 7 moves to the direction opposite to the above described embodiment.

Figure 7:
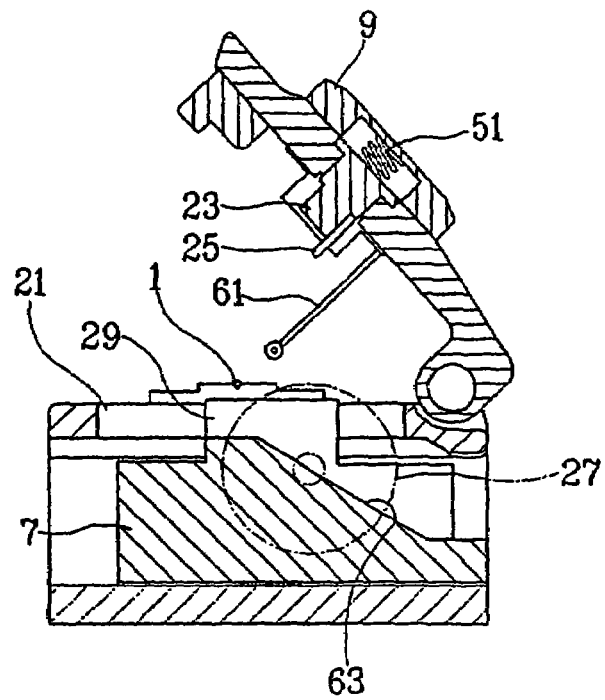
FIG. 7 is a front cross-sectional view showing an optical-fiber cutter according to a second embodiment of the present invention whose main lid is opened.

That is, as shown FIG. 7, an automatic optical-fiber cutter according to this embodiment includes a pressing pole 61 attached perpendicularly in lower surface of the main lid 9, and a cam on the slider 7 corresponding to the pressing pole 61. An end of the pressing pole 61 presses the inclined surface of the cam 63 when the main lid 9 is closed. Accordingly, the slider 7 presses the return spring 43 while moving. Then, the one-stroke cutting of the optical fiber 1 is performed. On the contrary, when the main lid 9 is opened, the cam 63 is released from the pressing pole 61, so that the slider is returned the initial non-cutting position by the tension force of the return spring 43. Accordingly, the moving direction of the slider 7 is opposite to the above-described embodiment.

Figure 8:
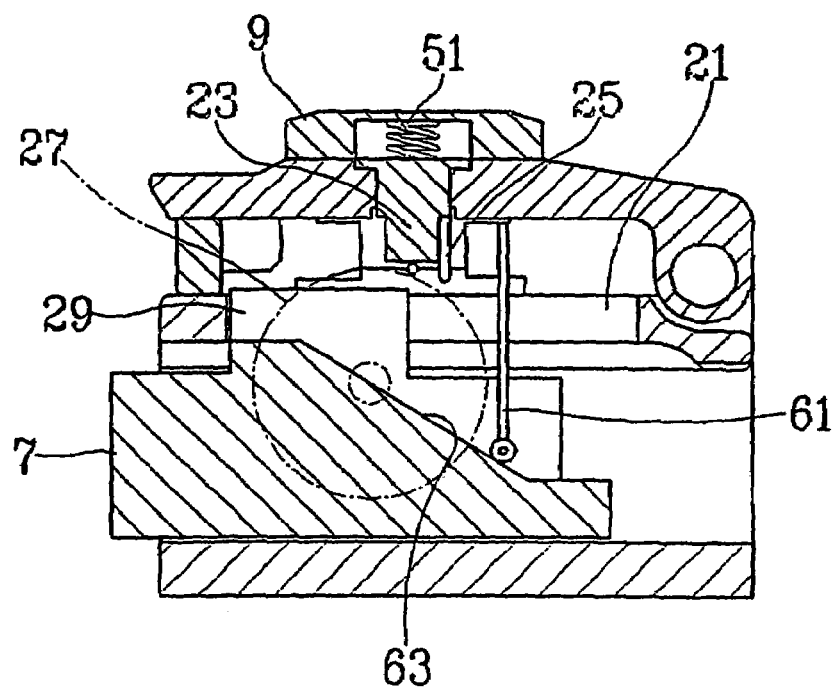
FIG. 8 is a front cross-sectional view showing the optical-fiber cutter according to the second embodiment whose main lid is closed.

With this difference in moving direction, the stop pin 35 and the protrusion pin 32 moved synchronously with the stop pin 35 may be left out of the embodiment illustrated in FIGS. 7 and 8.

THIRD EMBODIMENT

Hereinafter, a third embodiment of the present invention is described with reference to FIGS. 9 and 10.

In this embodiment, the main lid 9 has a size in which the upper surface of the stand 3 is generally covered, and the auxiliary lid 11 is arranged in the lower side of the main lid 9.

The main lid 9 has the counter holder 23 like the preceding embodiments. Moreover, the main lid 9 further includes a touch piece 71 having a magnet for opening/closing the auxiliary lid 11 synchronously and a magnet 73 for keeping the main lid 9 closed. Furthermore, a driving gear 75 is fixed to a pivot mounting part having a side adjacent the upper surface of the slider 7.

The driving gear 75 is engaged with a direction change gear 77, which is bearing supported in a side surface of the stand 3 and is engaged with a rack 79 fixed on the upper surface of the slider 7. In this embodiment, the slider 7 is arranged to be capable of reciprocating along the groove 5 formed in a side of the stand 3, but the groove 5 is different from above embodiment. In this embodiment, the structure of the groove 5 is defined by a wall 81 formed on the bottom of the stand 3.

Figure 9:
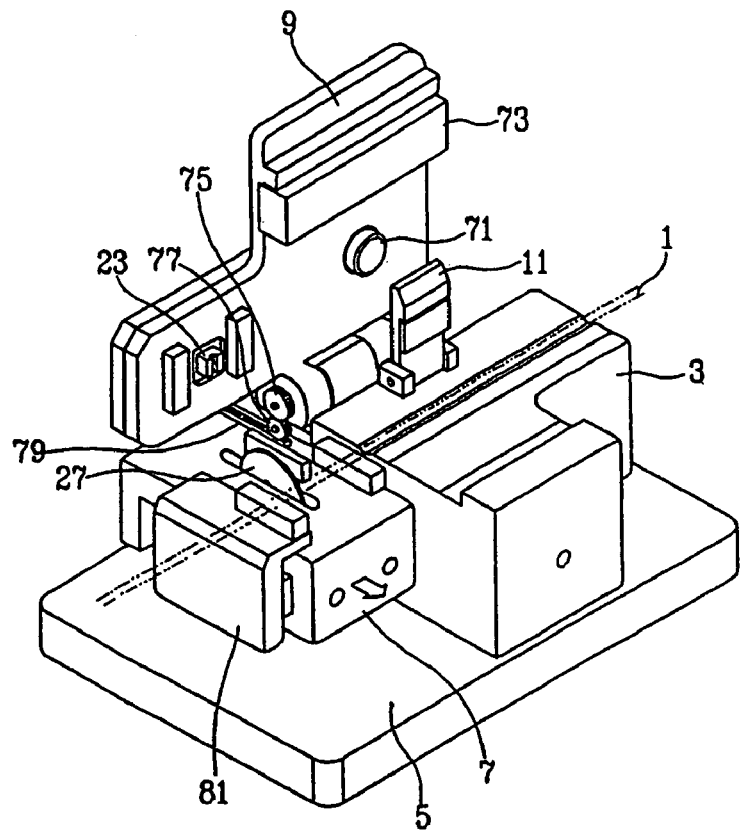
FIG. 9 is a perspective view showing an optical-fiber cutter according to a third embodiment of the present invention.
Figure 10:
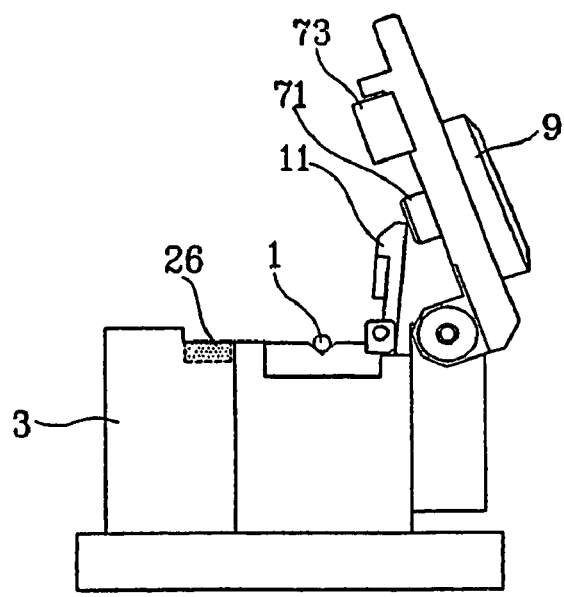
FIG. 10 a front cross-sectional view showing the operation of the auxiliary lid moved synchronously by opening/closing the main lid.

With this arrangement, as shown FIG. 10, the auxiliary lid 11 is pressed and closed by the touch piece 71. Therefore, the auxiliary lid 11 is opened and closed synchronously with the main lid 9, and the rotational force of the driving gear 75 is passed through the direction change gear 77 and delivered to the rack 79. Accordingly, the slider 7 cuts the optical fiber 1 in one stroke while moving in the direction of the arrow of FIG. 9. At this time, the one-stroke cutting should be performed simultaneously with closure of the main lid 9. The closed auxiliary lid 11 is pulled up and opened by the magnetic force of the touch piece 71 when the main lid 9 is opening.

Figure 11:
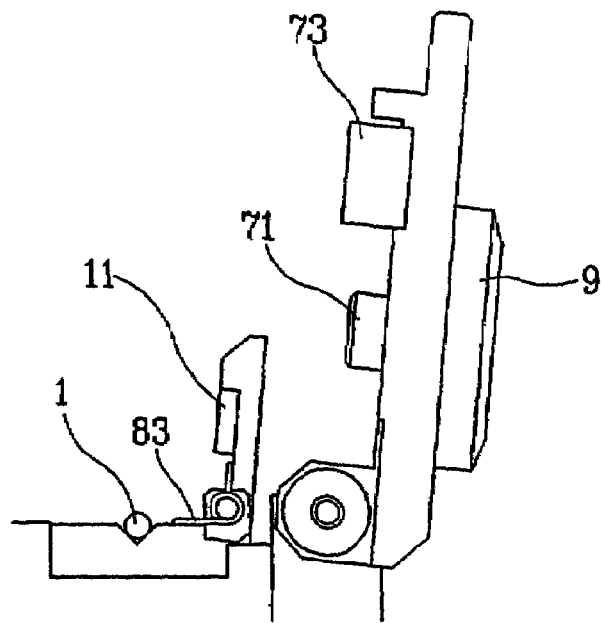
FIG. 11 is a partial magnified view showing a modified example of the auxiliary lid in the optical-fiber cutter according to the third embodiment of the present invention.

FIG. 11 shows an auxiliary lid 11 according to a modified example of the above embodiment of FIGS. 9 and 10. In the bearing part of the depicted auxiliary lid 11, a torsion spring 83 for biasing to the opening direction is arranged. The auxiliary lid 11 is biased toward a standing position so that the touch piece 71 need not have magnet force to open with the main lid 9.

Figure 12:
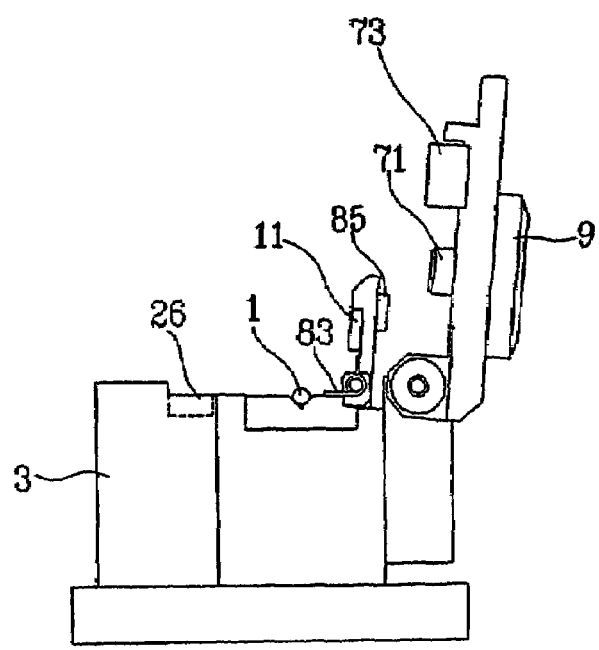
FIG. 12 is a partial magnified view showing another modified example of the auxiliary lid in the optical-fiber cutter according to the third embodiment of the present invention.

FIG. 12 shows another modified example according to the third embodiment of the present invention. The depicted touch piece 71 of the main lid 9 has magnet force. On the other hand, the auxiliary lid 11 is biased toward a standing position by the torsion spring 83, and a same-pole magnet 85 is attached on the outside surface opposite to main lid 9. Then, the touch piece 71 and the same-pole magnet 85 should have the same polarity so as to create a repulsive force against each other.

With this construction, the biasing force of the torsion spring 83 acts against the repulsive force in the auxiliary lid 11. Therefore, when the main lid 11 is closing, the auxiliary lid 9 can press the optical fiber 1 sufficiently as the repulsive magnetic force increases in proportion to the approach of the touch piece 71.

Further, the touch piece 71 is detached from the same-pole magnet 85 during opening, so that the repulsive magnetic force is weakened, whereas the biasing force of the torsion spring is strengthened. However, the auxiliary lid 11 presses the optical fiber 1 with the repulsive magnetic force until the main lid 9 is opened to some extent.

Although the details in the third embodiment described above are omitted in FIG. 12, the reciprocation movement of the slider 7, as shown the first embodiment, may be performed by the construction making use of the protrusion pin 31, the stop pin 35, the lever 37 of the main lid 9, the return spring 45 and so forth.

In the automatic optical-fiber cutter according to the present invention, by opening or closing only the main lid, the auxiliary lid and the edged tool are synchronously operated and the optical fiber is automatically cut. Therefore, the automatic optical-fiber cutter can be used easily to improve the efficiency of work. Moreover, the reciprocating movement of the edged tool is performed by mechanical structure so that the edged tool is not worn and damaged. In case the optical-fiber cutter is used in connection with communications equipment, it is assured that the optical fiber has high accuracy in the cutting surface thereof, thereby remarkably decreasing operation errors of the communications equipment.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An automatic optical-fiber cutter having main and auxiliary lids arranged on an upper surface of a stand and by which an optical fiber is pressed at two positions, and a slider provided with an edged tool and arranged to be capable of reciprocating in a groove formed on a side of the stand, said automatic optical-fiber cutter comprising:

an arm attached on a surface of the auxiliary lid opposite the main lid;

a pressing pin for pressing down the arm, a raising pin for raising up the arm and a lever for returning the slider to a non-cutting position, the pressing pin, the raising pin, and the lever respectively arranged in a predetermined position of the main lid;

a return spring for moving the slider to a cutting position, the return spring arranged in the inside of the stand adjacent to the groove;

a hole opened on an upper side of the stand so as to position a protrusion pin pressed by the main lid; and a stop pin for connecting with the protrusion pin through the hole to keep the slider in the non-cutting position, the stop pin arranged in a predetermined position on an upper surface of the slider.

2. An automatic optical-fiber cutter according to claim 1, wherein a magnet for keeping the auxiliary lid closed by using a magnetic force is fitted into the upper side of the stand.

3. An automatic optical-fiber cutter according to claim 1, wherein the arm of the auxiliary lid has a shape of an arc.

* * * * *